United States Patent  
Kantonen et al.

(10) Patent No.: US 6,655,167 B2
(45) Date of Patent: Dec. 2, 2003

(54) CRYOGENIC COMMINUTION OF RUBBER

(75) Inventors: Calvin Leslie Kantonen, Vancouver (CA); John Brian Nichols, Vancouver (CA); Philip Coulter, Whitby (CA)

(73) Assignee: First American Scientific Corp., Vancouver (CA)

( * ) Notice: Subject to any disclaimer, the term of this patent is extended or adjusted under 35 U.S.C. 154(b) by 0 days.

(21) Appl. No.: 10/127,662

(22) Filed: Apr. 23, 2002

(65) Prior Publication Data

US 2002/0189264 A1 Dec. 19, 2002

(Under 37 CFR 1.47)

(30) Foreign Application Priority Data

Apr. 27, 2001 (CA) .............................................. 2345393

(51) Int. Cl.[7] .......................... F25C 5/02; F25D 17/02; B02C 11/08; B02C 21/00; B02B 1/08
(52) U.S. Cl. ................ 62/320; 62/64; 241/23; 241/65
(58) Field of Search ............................. 62/64, 63, 62, 62/320; 241/17, 23, 62, 65

(56) References Cited

U.S. PATENT DOCUMENTS

| | | | | | |
|---|---|---|---|---|---|
| 4,025,990 A | * | 5/1977 | Lovette, Jr, | .................. | 241/14 |
| 4,124,997 A | * | 11/1978 | Sadjina et al. | ................ | 62/320 |
| 4,863,106 A | * | 9/1989 | Perkel | ............................. | 241/5 |
| 5,368,240 A | * | 11/1994 | Bonnet | ......................... | 241/41 |
| 6,354,523 B1 | * | 3/2002 | Liu | ............................. | 241/23 |
| 2001/0036969 A1 | * | 11/2001 | Pang | ......................... | 521/42.5 |
| 2002/0144933 A1 | * | 10/2002 | DeTampel | ..................... | 209/3 |

* cited by examiner

Primary Examiner—William C. Doerrler
(74) Attorney, Agent, or Firm—Birch, Stewart, Kolasch & Birch, LLP

(57) ABSTRACT

Rubber chips are immersed in a coolant to cool the chips to a the temperature in the range of −90 degrees to −110 degrees Celsius. The coolant contains alcohol such as n-butyl alcohol, methanol, pentane and is cooled by nitrogen. The cooled chips are then comminuted to a powder in the range of 10 mesh to 100 mesh ASTM in size.

14 Claims, 3 Drawing Sheets

CRYOGENIC COMMINUTION OF RUBBER

This invention relates to the cryogenic comminution of rubber and more particularly to a process by which scrap rubber can by cryogenically comminuted into a powder suitable for use in a variety of applications.

At the present time, very little scrap rubber is recycled because of the difficulty of pulverizing or comminuting it to particles of a size that are suitable for reuse. Scrap rubber can be cut or shredded into chips of about 2" to 3" in size but, in general, such chips are not fine enough for reuse. In most instances, the particles must be in the range of about 10 to about 100 mesh ASTM in size to be suitable for reuse.

Because of the difficulty of comminuting scrap rubber, most of it is disposed of in land-fill sites. The material is not suited to such disposal because it does not decompose or change in composition over time even when mixed with soil or other forms of manufactured waste. Furthermore, any buried rubber tends to rise to the surface over time due to its inherent dynamic buoyancy.

We have invented a process for the cryogenic comminution of scrap rubber into a powder suitable for use in a variety of applications. Briefly our process involves the steps of cooling chips of scrap rubber to a temperature in the range of about minus 90 to about minus 110 degrees Celsius; and comminuting the cooled rubber chips to powder substantially of a size of less than about 10 mesh ASTM.

The apparatus used to carry out the processes of my invention is described with reference to the accompanying drawings in which FIGS. 1, 2 and 3 are schematic elevations of the apparatus used to carry out three variations of the process.

BRIEF DESCRIPTION OF THE DRAWINGS

Like reference characters refer to like parts throughout the description of the drawings.

The starting material is chips or small pieces of scrap rubber. The chips or pieces should be small enough to pass through a screen having openings of about 2" by 3". The scrap rubber can be so-called "high-end" rubber from used tires or it can be "low-end" rubber consisting of elastomers, EPDM polymers, butyl and other waste from sources other than used tires. Such low-end scrap rubber originates from the production of a multitude of relatively small rubber parts used in industry and by consumers.

Low-end scrap rubber jams or stalls conventional shredding machines. Furthermore such rubber is difficult to grind mechanically because it overheats and damages the grinding apparatus. Such rubber can however be easily chipped into small pieces by way of a conventional guillotine-type cutting machine.

High-end scrap rubber can be cut into chips by conventional shredding means. Such chips contain particles of reinforcing steel and fibre and they can be eliminated magnetically, by screening, flotation or by other conventional means after the chips have been comminuted by the process of our invention.

Figure 1:
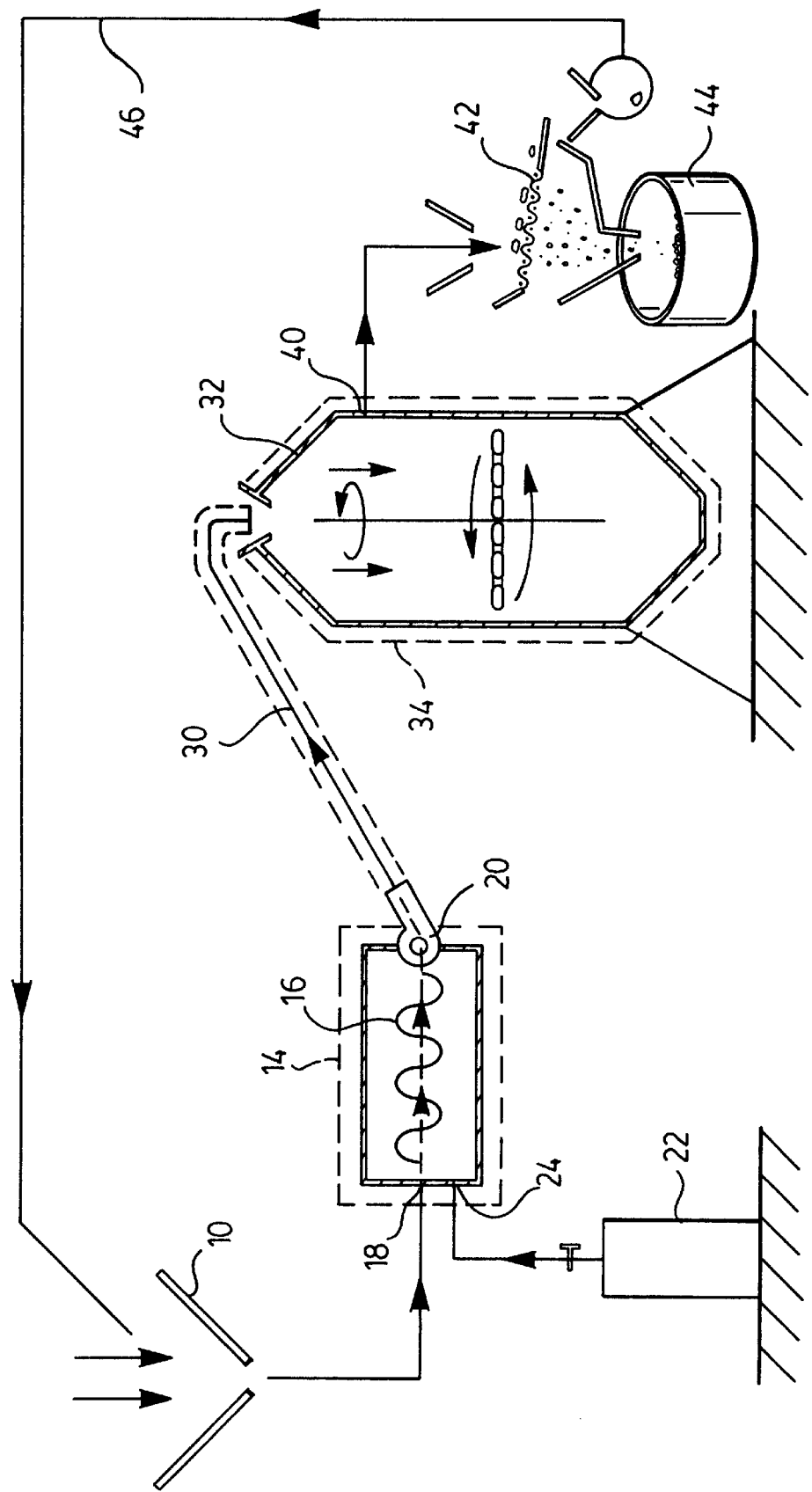
FIG. 1 depicts an embodiment of the apparatus of the present invention employing a cooling chamber together with a comminuting chamber.

With reference to FIG. 1, the apparatus includes a conical inlet 10 into which the chips of scrap rubber are fed. The chips are conveyed to an insulated cooling chamber 14. The chamber is sealed from the atmosphere and has an auger or conveyor belt 16 which transfers the chips from the point of entry 18 to an exit 20. Liquid nitrogen at a temperature of about −180 degrees C. is fed from a cylinder 22 into the chamber at 24.

The chips are in contact with liquid and nitrogen vapour in the chamber and are cooled by it. The temperature at the core of the chips which exit the chamber should be the range of about −90 to about −110 degrees C. In this range, the rubber becomes quite brittle and can be fractured relatively easily in a conventional pulverizer or a milling machine. At higher temperatures, the rubber will not readily fracture when ground. Instead the rubber will overheat and jam or gum-up the grinding or pulverizing machine.

At temperatures lower than about minus 110 degrees C., the rubber is not much more brittle or easy to comminute than at a temperature within the range of −90 to −110 degrees C. It becomes increasingly costly and time consuming to cool rubber below −110 degrees C. and there is no advantage to doing so.

The temperature of the chips can be lowered by increasing the flow of the nitrogen into chamber 14. The temperature can also be lowered by slowing the rate of travel of the chips through the chamber so that they are in contact with the nitrogen for a longer period of time. If the chips are moved by an auger, its rate of rotation can be slowed or if the chips are moved by a belt, the belt can be slowed down. To raise the temperature of the chips, the flow of nitrogen into chamber 14 can be decreased and the rate of travel of the chips through the chamber can be increased.

Cooled chips from the cooling chamber are conveyed pneumatically through an insulated conduit or tube 30 of relatively small inside diameter. Air from outside the chamber mixed with nitrogen vapour exhausted from the chamber is used to propel the frozen chips to a comminuting chamber 32. The chips remain at about the same temperature as they travel through the tube. The nitrogen vapour and outside air serve not only to keep the chips cool before and during comminution but also, as indicated above, serve to propel the cooled chips through the tube to comminuting chamber 32.

In chamber 32, the frozen chips fall into the centre of the chamber and are thrust violently radially outward against the wall of the chamber by means of one or more chains. The chips contact the wall with such force that they shatter into smaller particles. The outer wall of the chamber is insulated at 34 by convention means such as fibreglass bats or insulated boards in order to ensure that the temperature of the chips within the comminuting chamber is not significantly affected by ambient conditions outside the chamber. Preferably the exterior of the chamber is insulated to a minimum of R15 (0.07 BTU/F/sq.ft.) in order to minimize heat transfer into the chamber from the air surrounding the chamber.

The comminuting chamber suitable for use is described in U.S. Pat. Nos. 5,839,671 and 6,024,307 issued on Nov. 24, 1998 and Feb. 15, 2000, respectively, both to Sand et al. and the contents of these patents are incorporated into this application by reference. However, the comminuting chambers described in these patents are not insulated and are to be distinguished from comminuting chamber 32 in this respect. Otherwise the chambers are similar.

While the chips in the comminuting chamber will be about −90 degrees to about −110 degrees C., the average temperature of the air within the chamber should not be lower than about −60 degrees C. If the temperature is much lower than this, the chains may become brittle and break and the walls of the chamber likewise may become brittle and crack. The temperature can be adjusted by adjustment of the amount of air which is used to propel the chips through tube 30 and the rate at which the mixture of air and nitrogen vapour is exhausted from the chamber.

The particles of rubber which exit from the comminuting chamber at 40 are substantially in the range of 20 to 100 mesh ASTM. If some particles are larger, they can be separated from smaller particles by means of a screen 42. Particles which pass through the screen are collected in bin 44 and are further treated for separation of impurities such as reinforcing steel, fibres and so on. Particles which collect on the screen are recycled either hydraulically or pneumatically through conduit 46 to the inlet 10.

Figure 2:
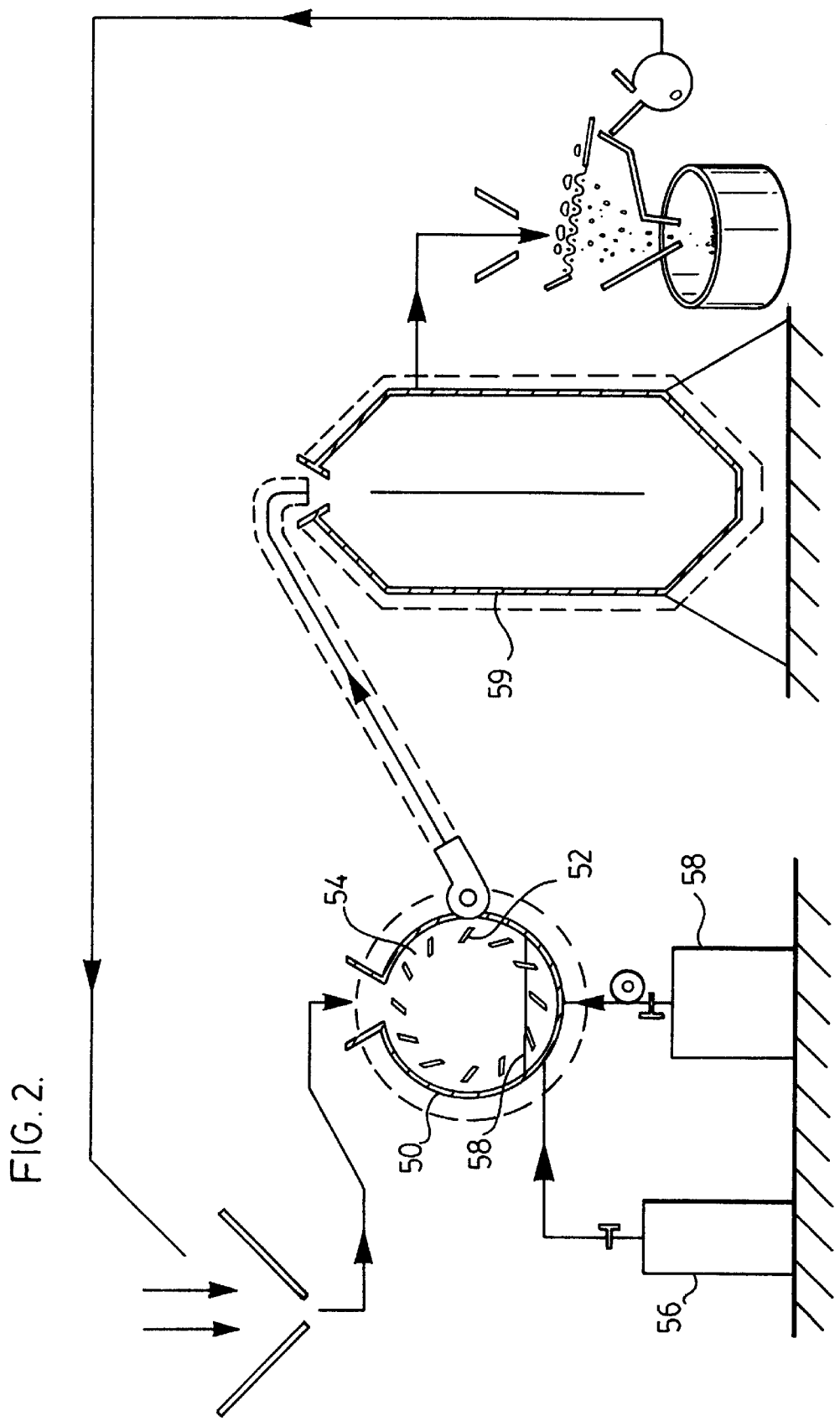
FIG. 2 depicts an embodiment of the apparatus of the present invention employing an insulated cooling tank together with a comminuting chamber.

With reference to FIG. 2, the apparatus is the same as in FIG. 1 except that an insulated cooling tank 50 in which the rubber chips are tumbled is substituted for cooling chamber 14 of FIG. 1. In addition, the coolant is a mixture of nitrogen and alcohol. This is to be contrasted with the apparatus of FIG. 1 where the coolant is pure nitrogen.

Cooling tank 50 has a number of radially oriented vanes 52 which are mounted to the inside wall of a rotating cylinder 54. The chips are introduced into one end of the cylinder and are kept in motion or are tumbled by the vanes as the chips travel toward the other end of the cylinder.

Blended alcohol from one or more containers 58 flows into the cooling tank and nitrogen vapour from cylinder 56 is bubbled into the blend. The nitrogen serves to cool the mixture to a temperature of about −100 degrees C. The chips mix the alcohol and nitrogen as they tumble in the tank. The mixture is partly vapour and partly liquid. The liquid component settles in the bottom of the tank at 58 and the chips are continuously immersed in the mixture as they tumble within the tank.

A mixture of alcohol and liquid nitrogen is a desirable coolant for a number of reasons: first, the mixture is significantly cheaper than pure nitrogen and the rubber chips can be cooled at significantly lower cost. Secondly the mixture readily penetrates into the interstices of the rubber chips and causes more rapid cooling than nitrogen vapour which tends to coat or blanket the surface of the rubber chips but does not engulf them as the alcohol blend does. Thirdly, the mixture lubricates the chips and makes them slippery. Being slippery, they travel more smoothly in the auger or on the conveyor belt.

A fourth reason why a mixture of alcohol and nitrogen is desirable as a coolant is that alcohol in the mixture wets the surface of the rubber chips and causes the rubber fines to adhere to the larger particles and not to become airborne as dust. Finally, alcohol tends to act both as an insulator and a refrigerant. As a result, the rubber chips remain at the desired temperature range for longer when coated with alcohol than when un-coated. This is because the alcohol, when it coats the rubber chips, temporarily insulates them and, when the chips are out of the alcohol blend and airborne in tube 30, freezing continues through evaporative cooling.

The alcohol must have a freezing point of below about −120 degrees C. to avoid freezing in the cooling tank. The alcohol is preferably a blend of two or more alcohols such methanol and n-butyl alcohol. A denatured corn alcohol sold under the trade-mark "Van-Col 729" by Van Waters & Rogers Ltd., a subsidiary of Univar of Weston, Ontario, Canada is a suitable n-butyl alcohol. The alcohol may also be a blend of Van-Col and pentane. Van-Col is cheaper than either methanol or pentane but its freezing point is −110 degrees C. That freezing point is within in the acceptable range of temperature for the rubber chips and should the chips be at that temperature or lower, the Van-Col will suddenly freeze and the cooling chamber will become inoperative. Methanol or pentane, while more expensive, have lower freezing points and act to lower the freezing point when blended with Van-Col. Preferably sufficient methanol or pentane is added to the Van-Col to ensure that the freezing point of the resulting mixture is about −120 degrees C.

Most alcohols in the atmosphere at temperatures above 0 degrees C. are volatile and highly combustible, some explosively so. Their vapours are likewise highly combustible. If liquid and gaseous alcohol are not insulated from oxygen, they may be ignited by a spark and cause serious damage to the equipment containing the rubber chips. They may also cause injury or even death to an operator in the vicinity of the equipment. Nitrogen in the mixture creates a gaseous blanket surrounding the chips in the cooling tank and is effective in preventing the alcohol and its vapour from igniting should the ambient temperature exceed about 0 degrees C. Also effective is the control of the temperature of gases such as air within the chamber. As long as the liquid or gaseous alcohol is below about −5 degrees, it is relatively stable and non-combustible and is suitable for use.

Alcohol cooled by nitrogen is suitable for cooling the rubber chips. Other means for cooling the chips are also suitable. A conventional cascade refrigerating system (not illustrated) is suitable for this purpose. In such a system two or more refrigerating systems using special refrigerants are interconnected and operate simultaneously.

During cooling, the chips should be cooled until the temperature at their cores is preferably within the range of −90 to −110 degrees C. The temperature at their surfaces may be lower than this without significant impairment in the effectiveness of the process.

Excess nitrogen in the cooling tank may be expelled to the atmosphere but preferably is captured and recycled to the cooling tank or is mixed with outside air and is used to propel the chips to comminuting chamber 59. The nitrogen also serves to cool the comminuting chamber.

Figure 3:
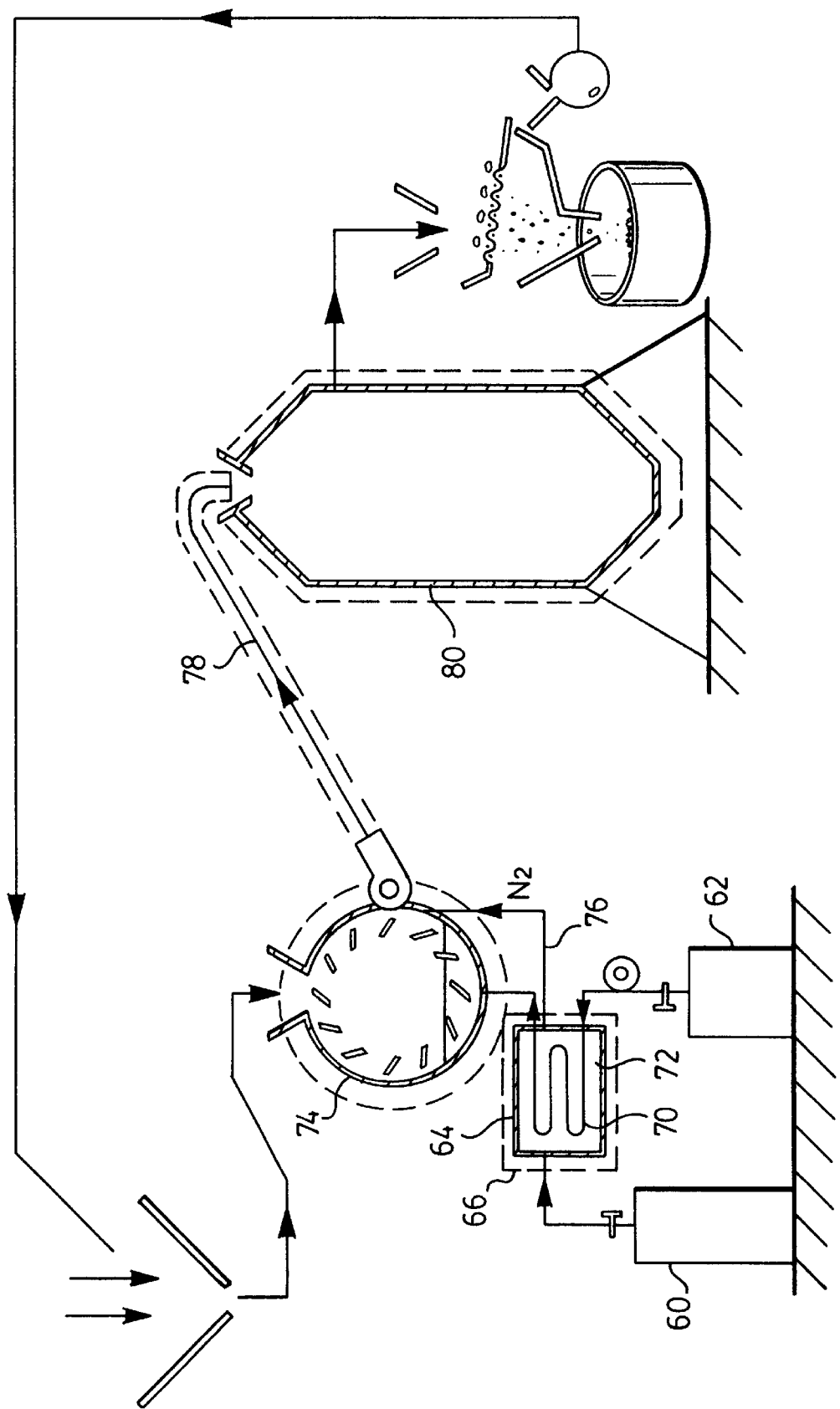
FIG. 3 depicts an embodiment of the apparatus of the present invention employing a tube-in-shell heat exchanger together with a cooling tank and a comminuting chamber.

With reference to FIG. 3, the apparatus is the same as in FIG. 2 except that nitrogen and alcohol from cylinder 60 and container 62 flow into a so-called "tube-in-shell" or "tube-in-tube" heat exchanger 66. This is to be contrasted with the apparatus of FIG. 2 in which the nitrogen and alcohol flow directly as a mixture into the cooling tank.

The heat exchanger is conventional and is insulated by an insulating jacket 66. The exchanger is provided with a coil or "tube" 70 through which the alcohol flows. The alcohol is the same blend as in FIG. 2. The nitrogen flows into the hollow interior or "shell" 72 of the chamber surrounding the coil.

The alcohol flows through the coil where it is cooled by the nitrogen to a temperature within the required range of −90 to −110 degrees C. The cooled alcohol then flows into cooling tank 74 where it cools the rubber chips. Nitrogen vapour in the exchanger flows through conduit 76 into the cooling tank and from there it flows through tube 78 to comminuting chamber 80. The vapour serves to maintain the rubber chips at the required temperature while they travel to and into comminuting chamber 80.

The apparatus of FIG. 3 consumes less nitrogen to cool the rubber chips than the apparatus of FIG. 2 and even more so, the apparatus of FIG. 1. The cost of liquid nitrogen is significantly higher than the cost of the alcohol and for this reason the apparatus of FIG. 3 can be operated at significantly lower cost than the apparatus of FIG. 2. As for the apparatus of FIG. 1, since its coolant is solely nitrogen, it is considerably more expensive to operate than the apparatus of the other two Figures.

While the comminuting chamber described above is the preferred apparatus for comminuting the rubber chips, the chips can be comminuted in other apparatus such as a conventional pulverizer or a milling machine.

It will be understood of course that modifications can be made in the processes described herein without departing from the scope and purview of the invention as claimed in the claims which follow.

We claim:

1. A process for the comminution of rubber chips comprising the steps of:
    (a) providing an alcohol-containing coolant comprised of a mixture of n-butyl alcohol and at least one of methanol and pentane maintained at a temperature in the range of −90 to 110° C.;
    (b) contacting said chips with said coolant in order to cool said chips to a temperature within said range; and
    (c) comminuting said cooled chips to powder substantially of a size of less than about 10 mesh ASTM.

2. The process of claim 1, wherein said coolant has a freezing point below −120° C.

3. The process of claim 1, wherein said coolant further comprises nitrogen.

4. A process for the comminution of rubber chips which pass through a screen having openings of a size within the range of 2 inches to 3 inches, said process comprising the steps of:
    (a) providing an alcohol-containing coolant comprised of a mixture of n-butyl alcohol and at least one of methanol and pentane maintained at a temperature in the range of −90 to −110° C.;
    (b) contacting said chips with said coolant in a cooling chamber to cool said chips to a temperature within said range;
    (c) passing said cooled chips to a comminuting chamber; and
    (d) comminuting said cooled chips to a size within the range of 20 mesh to 100 mesh ASTM.

5. The process of claim 4, wherein vapor is collected from said cooling chamber and used to pass said cooled chips to said comminuting chamber.

6. The process of claim 4, comprising separating comminuted particles having a size greater than 20 mesh from said comminuted particles and recycling said separated particles to said cooling chamber.

7. The process of claim 4, wherein said coolant has a freezing point below about −120° C.

8. The process of claim 7, wherein said coolant further comprises nitrogen.

9. The process of claim 8, further including the step of cooling said alcohol by means of nitrogen in a heat exchanger prior to introduction of said coolant into said cooling chamber.

10. The process of claim 7, further including the step of cooling said coolant in a cascade refrigerating system prior to introduction of said coolant into said cooling chamber.

11. The process of claim 9, further including the step of passing said coolant through a coil in said heat exchanger and causing nitrogen to surround said coil.

12. The process of claim 11 further including the step of passing nitrogen vapor from said heat exchanger to said cooling chamber.

13. The process of claim 9 further including the step of recirculating liquid nitrogen from said heat exchanger to a source from which nitrogen is used to cool said coolant.

14. The process of claim 4 wherein said comminuting chamber is insulated to reduce the transfer of heat to said comminuting chamber.

* * * * *